United States Patent
Brown

(10) Patent No.: US 12,226,783 B2
(45) Date of Patent: *Feb. 18, 2025

(54) SYSTEM AND METHOD FOR PROCESSING SCRAP MATERIAL

(71) Applicant: BlueScope Recycling and Materials LLC, Kansas City, MO (US)

(72) Inventor: Brian D. Brown, Kendallville, IN (US)

(73) Assignee: BlueScope Recycling and Materials LLC, Kansas City, MO (US)

(*) Notice: Subject to any disclaimer, the term of this patent is extended or adjusted under 35 U.S.C. 154(b) by 47 days.

This patent is subject to a terminal disclaimer.

(21) Appl. No.: 18/113,943

(22) Filed: Feb. 24, 2023

(65) Prior Publication Data

US 2024/0017271 A1    Jan. 18, 2024

Related U.S. Application Data

(63) Continuation of application No. 16/689,166, filed on Nov. 20, 2019, now Pat. No. 11,590,513.
(Continued)

(51) Int. Cl.
*B07C 5/342* (2006.01)
*B02C 23/14* (2006.01)
(Continued)

(52) U.S. Cl.
CPC .............. *B03C 1/247* (2013.01); *B02C 23/14* (2013.01); *B07C 5/3422* (2013.01); *B07C 5/344* (2013.01);
(Continued)

(58) Field of Classification Search
CPC ..... B03C 1/247; B03C 2201/20; B02C 23/14; B07C 5/34; B07C 5/3422; B07C 2501/0063
(Continued)

(56) References Cited

U.S. PATENT DOCUMENTS 9,370,780 B2 * 6/2016 Nolan ................. C22B 7/04
11,590,513 B1 * 2/2023 Brown ................. B03C 1/30
(Continued)

FOREIGN PATENT DOCUMENTS

CN      110860373 A  *  3/2020  ............. B03C 1/18
DE  102009055766 A1 *  5/2011  ............. B02C 18/14

*Primary Examiner* — Terrell H Matthews
(74) *Attorney, Agent, or Firm* — K&L Gates LLP

(57) ABSTRACT

A system for processing scrap material that includes a variable-power electromagnetic drum separator wherein shredded scrap material is placed in free fall at a position proximate the electromagnetic drum separator. A first fraction of the scrap material is attracted to the electromagnetic drum separator and is carried under the rotational axis of the electromagnetic drum separator thereby separating the first fraction of material from a second fraction of the material which continues to free fall and wherein the first fraction is a low-copper ferrous material with the second fraction having a higher non-ferrous content than the first fraction. A magnetic drum separator may be positioned upstream of the variable-power electromagnetic drum separator and be used to separate non-ferrous materials. The variable-power electromagnetic drum separator may be adjusted so that the second fraction includes some ferrous material. A robotic picker may be used to remove undesirable materials from the second fraction.

20 Claims, 15 Drawing Sheets

Related U.S. Application Data

(60) Provisional application No. 62/770,201, filed on Nov. 21, 2018.

(51) Int. Cl.
*B03C 1/247* (2006.01)
*B07C 5/344* (2006.01)

(52) U.S. Cl.
CPC .. *B03C 2201/20* (2013.01); *B07C 2501/0063* (2013.01)

(58) Field of Classification Search
USPC .................................................. 209/25.5
See application file for complete search history.

(56) References Cited

U.S. PATENT DOCUMENTS

| | | | | |
|---|---|---|---|---|
| 2009/0159511 A1* | 6/2009 | Molteni | ............... | B03C 1/0335 |
| | | | | 209/636 |
| 2011/0240528 A1* | 10/2011 | Ruiz | ...................... | B02C 23/08 |
| | | | | 209/214 |
| 2012/0111977 A1* | 5/2012 | Shuttleworth | ............ | B03C 1/18 |
| | | | | 241/24.25 |
| 2016/0074875 A1* | 3/2016 | Nolan | ...................... | B03C 1/30 |
| | | | | 209/11 |

\* cited by examiner

MID RECOVERY PROCESS (3 MAG)--FLOW DIAGRAM
Permanent Mag Recovery and ElectroMag Refining

MID RECOVERY PROCESS (3 MAG)--FLOW DIAGRAM
ElectroMag Recovery and Refining

MID REFINING PROCESS (3 MAG)--FLOW DIAGRAM
Permanent Mag Recovery and ElectroMag Refining

MID REFINING PROCESS (3 MAG)--FLOW DIAGRAM
ElectroMag Recovery and Refining

SYSTEM AND METHOD FOR PROCESSING SCRAP MATERIAL

CROSS REFERENCE TO RELATED APPLICATIONS

This application is a continuation of U.S. patent application Ser. No. 16/689,166, entitled "System and Method for Processing Scrap Material," filed Nov. 20, 2019, and issued as U.S. Pat. No. 11,590,513 on Feb. 28, 2023, which claims priority under 35 U.S.C. 119(e) to U.S. Provisional Patent Application No. 62/770,201, filed on Nov. 21, 2018 and entitled "System and Method for Processing Scrap Material," the disclosures of which are hereby incorporated by reference in their entirety.

BACKGROUND

1. Technical Field

The present invention relates to the processing of scrap materials and, more particularly, to the separation of different types of scrap material.

2. Description of the Related Art

Scrap metal material is often recycled. Scrap ferrous metal materials which are re-melted and used in the production of low-copper ferrous alloys are a major component of the metal recycling industry. Free copper material in shredded ferrous material presents a significant obstacle to generating ferrous scrap material suitable for use in producing recycled low-copper ferrous alloys. A higher copper content reduces the value of the ferrous scrap material and also limits the relative amount of the ferrous scrap material that can be used in the production of recycled low-copper ferrous alloys.

Shredding automobiles is a significant source of shredded ferrous material. Various methods are known for reducing the copper content of the resulting shredded ferrous material. Hand-picking free copper from the entire shredded ferrous material output with manual labor is currently the most commonly employed method.

At least partially automated methods are also known. For example, it is known to use X-ray fluorescence (XRF) to analyze the shredded ferrous material and use blasts of air to separate free copper material from the shredded ferrous material.

Other methods employ magnetism to assist in the separation of shredded ferrous material into separate fractions. One of the fractions will have a lower copper content and the other fraction will have a higher copper content. The copper content of both fractions can then be further reduced by handpicking using manual labor.

For example, it is known to use a conveyor belt that wraps around a magnetic head pulley to separate the shredded ferrous material into two fractions. Highly-magnetic materials with lower profiles and smaller mass are attracted by the magnetic field and wrap around the head of the pulley and are carried by the belt to one side of a splitter after which this low-copper fraction is hand-picked to further reduce copper content. Lower magnetic materials with larger profiles and greater mass have enough momentum to escape the magnetic field and are thrown from the end of the belt over the splitter and form the high copper fraction, which is typically hand-picked to further reduce copper content.

Such high-speed conveyor belts present significant maintenance issues with the belt typically wearing out relatively quickly and such systems often have significant downtimes. It also presents difficulties in operation. For example, it is quite common for the operators of the conveyor belt to slow the belt speed to alleviate the work-load on the operators. Slowing the belt speed, however, causes more material to be trapped by the magnetic field and increases the amount of copper material in the low-copper fraction.

Improvements in the processing of shredded ferrous material are desirable.

SUMMARY

The present application provides a system and method for processing shredded scrap material that allows for the effective and efficient separation of free copper material to generate a low-copper shredded ferrous material.

The invention comprises, in one form thereof, a system for processing scrap material that includes an electromagnetic drum separator formed by a variable-power electromagnetic drum separator having a rotational axis wherein shredded scrap material is transported toward the electromagnetic drum separator and is placed in free fall at a position proximate the electromagnetic drum separator. A first fraction of the shredded scrap material is attracted to the electromagnetic drum separator and is carried under the rotational axis of the electromagnetic drum separator by rotation of the electromagnetic drum separator thereby separating the first fraction of shredded scrap material from a second fraction of the shredded scrap material which continues to free fall from the position proximate the electromagnetic drum separator and wherein the first fraction is a low-copper ferrous material with the second fraction having a higher copper content than the first fraction.

In some embodiments, a magnetic drum separator is used to process an initial supply of scrap material upstream of the electromagnetic drum separator, the magnetic drum separator separating non-magnetic materials from the initial supply of scrap material to thereby divide the initial supply of scrap material into two fractions: (1) a non-magnetic material fraction and (2) the shredded scrap material transported toward the electromagnetic drum separator.

In some embodiments having such a magnetic drum separator, the magnetic drum separator defines a second rotational axis and includes a magnetic assembly for attracting ferrous material. The magnetic assembly may take the form of a permanent magnetic assembly or an electromagnetic assembly. The magnetic drum separator attracts ferrous material from the initial supply of scrap material and carries the attracted material under (or over) the second rotational axis by rotation of the magnetic drum separator to thereby separate the attracted material from the fraction of non-magnetic materials, the attracted materials forming the shredded scrap material transported toward the electromagnetic drum separator.

In some embodiments of the system having a magnetic drum separator, the system further includes a first vibratory pan which conveys the initial supply of scrap material toward the magnetic drum separator and allows the initial supply of scrap material to free fall from the first vibratory pan proximate to the magnetic drum separator, the magnetic drum separator attracting ferrous material from the free falling scrap material to separate a fraction of the material to form the shredded scrap material transported toward the electromagnetic drum separator, the magnetic drum separator carrying the shredded scrap material under (or over) the rotational axis of the magnetic drum separator and dropping the shredded scrap material onto a second vibratory pan, the second vibratory pan transporting the shredded scrap material to the position where the shredded scrap material is allowed to free fall proximate the electromagnetic drum separator, the second vibratory pan dropping the stream of shredded scrap material at a vertical height located above the rotational axis of the electromagnetic drum separator.

In some embodiments of the system having a magnetic drum separator, the magnetic drum separator forms a first magnetic recovery drum separator and the system further includes a second recovery drum separator which receives the shredded scrap material generated by the first magnetic recovery drum separator. The second recovery drum separator separating additional non-magnetic materials from the shredded scrap material generated by the first magnetic recovery drum separator. The second magnetic recovery drum separator having a second magnetic assembly that attracts ferrous material wherein the second recovery drum separator carries the attracted ferrous materials underneath (or over) an axis of rotation of the second magnetic recovery drum separator during operation to separate the attracted ferrous materials and wherein the attracted ferrous materials separated by the second recovery drum separator form the shredded scrap material transported to the electromagnetic drum separator. The magnetic assemblies of the magnetic recovery drum separators may be either permanent magnetic assemblies or electromagnetic assemblies or a combination of the two.

In any of the described embodiments of the system, the electromagnetic drum separator may form a first refining electromagnetic drum separator with the system further including a second refining electromagnetic drum separator. The second refining electromagnetic drum separator is formed by a variable-power electromagnetic drum separator wherein the second fraction of shredded scrap material generated by the first refining electromagnetic drum separator is transported toward the second refining electromagnetic drum separator and is placed in free fall at a position proximate the second refining electromagnetic drum separator whereby the second fraction of shredded scrap material is divided into third and fourth fractions. The third fraction of the shredded scrap material is attracted to the second refining electromagnetic drum separator and is carried under a rotational axis of the second refining electromagnetic drum separator by rotation of the second refining electromagnetic drum separator and thereby separates the third fraction of shredded scrap material from the fourth fraction of the shredded scrap material which continues to free fall from the position proximate the second refining electromagnetic drum separator and wherein the fourth fraction has a higher copper content than the third fraction.

In some embodiments of the system, the electromagnetic drum separator is a variable-power, axial pole, electromagnetic drum separator and the magnetic field strength of the electromagnetic drum separator is adjustable so that the second fraction of the stream of shredded scrap includes some ferrous material.

In those embodiments having a variable-power electromagnetic drum separator, the magnetic field strength may be adjustable so that the second fraction, i.e., that portion that continues to free fall, includes electric machine rotors and stators which are formed by a ferrous metal core and copper windings.

In some embodiments, the system further includes at least one automated robotic picker for removing copper and other undesirable materials from the second fraction. Such an embodiment may also include at least one sensor for identifying material to be removed from the second fraction by the automated robotic picker. The at least one sensor may take the form of a digital camera, induction sensor, near infrared camera and/or a 3-dimensional laser measurement sensor. In some embodiments, the robotic picker includes at least one gantry structure for moveably supporting a robotic arm, the robotic arm being adapted to selectively grab pieces of scrap material, the robotic arm being moveable in a direction transverse and longitudinal to a direction of movement of the second fraction.

The invention comprises, in another form thereof, a method of processing scrap material. The method includes processing a shredded scrap material with an electromagnetic drum separator formed by a variable-power electromagnetic drum separator having a rotational axis wherein shredded scrap material is transported toward the electromagnetic drum separator and is placed in free fall at a position proximate the electromagnetic drum separator; attracting to the electromagnetic drum separator a first fraction of the shredded scrap material and rotating the electromagnetic drum to carry the first fraction of the shredded scrap material under the rotational axis of the electromagnetic drum separator to thereby separate the first fraction of the shredded scrap material from a second fraction of the shredded scrap material which continues to free fall from the position proximate the electromagnetic drum separator and wherein the first fraction is a low-copper ferrous material with the second fraction having a higher copper content than the first fraction; and adjusting the strength of the magnetic field of the electromagnetic drum separator to achieve a desired non-ferrous and/or copper content in the first fraction of the shredded scrap material.

The method may also include processing an initial supply of scrap material upstream of the electromagnetic drum separator with a magnetic drum separator wherein the magnetic drum separator defines a second rotational axis and includes a magnetic assembly, the magnetic drum assembly attracting ferrous material from the initial supply of scrap material with the magnetic assembly and carrying the attracted material under (or over) the second rotational axis by rotation of the magnetic drum separator to thereby separate the attracted material from a non-magnetic material fraction; and transporting the attracted material toward the electromagnetic drum separator whereby it forms the shredded scrap material processed by the electromagnetic drum separator. The magnetic assembly may take the form of either a permanent magnetic assembly or an electromagnetic assembly.

The method may further include using a first vibratory pan to transport the initial supply of scrap material toward the magnetic drum separator and allowing the initial supply of scrap material to free fall from the first vibratory pan proximate the magnetic drum separator; wherein the step of processing the initial supply of scrap material with the magnetic drum separator includes attracting ferrous material from the free falling scrap material with the magnetic drum separator to separate a fraction of the material to form the shredded scrap material transported toward the electromagnetic drum separator by using the magnetic drum separator to carry the shredded scrap material under (or over) the rotational axis of the magnetic drum separator and dropping the shredded scrap material onto a second vibratory pan; and using the second vibratory pan to transport the shredded scrap material to the position where the shredded scrap material is allowed to free fall proximate the electromagnetic drum separator and allowing the shredded scrap material to free fall from the second vibratory pan at a vertical height located above the rotational axis of the electromagnetic drum separator.

The electromagnetic drum separator used in the method may be a variable-power, axial pole, electromagnetic drum separator and the method may further include adjusting the magnetic field strength of the electromagnetic drum separator so that the second fraction of the stream of shredded scrap includes some ferrous material; using at least one sensor to identify copper and other undesirable materials to be removed from the second fraction wherein the at least one sensor includes a digital camera, induction sensor, near infrared camera, and/or a 3-dimensional laser measurement sensor; and using a robotic picker to selectively grab the identified material to be removed from the second fraction and removing the identified material with the robotic picker, the robotic picker including at least one gantry structure for moveably supporting a robotic arm, the robotic arm being adapted to selectively grab the pieces of identified material and being moveable in a direction transverse to a direction of movement of the second fraction.

The method may also include shredding a plurality of automobiles and other scrap to generate the initial supply of scrap material.

In some embodiments, the strength of the magnetic field of the electromagnetic drum separator is adjusted so that the second fraction of the shredded scrap material includes some ferrous material. In such embodiments, the strength of the magnetic field of the electromagnetic drum separator may be adjusted so that the second fraction of the shredded scrap material includes electric machine rotors and stators which are formed by a ferrous metal core and copper windings. The method may further include the step of using a robotic picker to remove from the second fraction of the shredded scrap material any electric machine rotors and stators which are formed by a ferrous metal cores and copper windings.

In those embodiments of a method having a magnetic drum separator, the magnetic drum separator may form a first magnetic recovery drum separator and the method may further include processing the ferrous containing material generated by the first magnetic recovery drum separator with a second magnetic recovery drum separator wherein the second magnetic recovery drum separator includes a second magnetic assembly that attracts ferrous material from the ferrous containing material generated by the first magnetic recovery drum separator, the second magnetic recovery drum separator carrying the attracted ferrous material under (or over) a rotational axis of the second magnetic recovery drum separator to thereby separate the attracted material from a second non-magnetic material fraction; and transporting the attracted material generated by the second magnetic recovery drum separator toward the electromagnetic drum separator.

In any of the embodiments of a method, the electromagnetic drum separator may form a first refining electromagnetic drum separator and the method may also include further processing the second fraction of shredded scrap material with a second refining electromagnetic drum separator formed by a variable-power electromagnetic drum separator wherein the second fraction of shredded scrap material is transported toward the second refining electromagnetic drum separator and is placed in free fall at a position proximate the second refining electromagnetic drum separator to thereby separate the second fraction of shredded scrap material into third and fourth fractions of the shredded scrap material. The method further includes attracting to the second refining electromagnetic drum separator the third fraction of the shredded scrap material and rotating the second refining electromagnetic drum to carry the third fraction of the shredded scrap material under the rotational axis of the electromagnetic drum separator to thereby separate the third fraction of the shredded scrap material from the fourth fraction of the shredded scrap material which continues to free fall from the position proximate the second refining electromagnetic drum separator wherein the fourth fraction has a higher copper content than the third fraction. The method may also include adjusting the strength of the magnetic field of the second refining electromagnetic drum separator to achieve a desired copper content in the third fraction of the shredded scrap material.

In any one of the methods and systems described above, the processing of the scrap material may be fully automated without any hand-picking of scrap material using manual labor.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
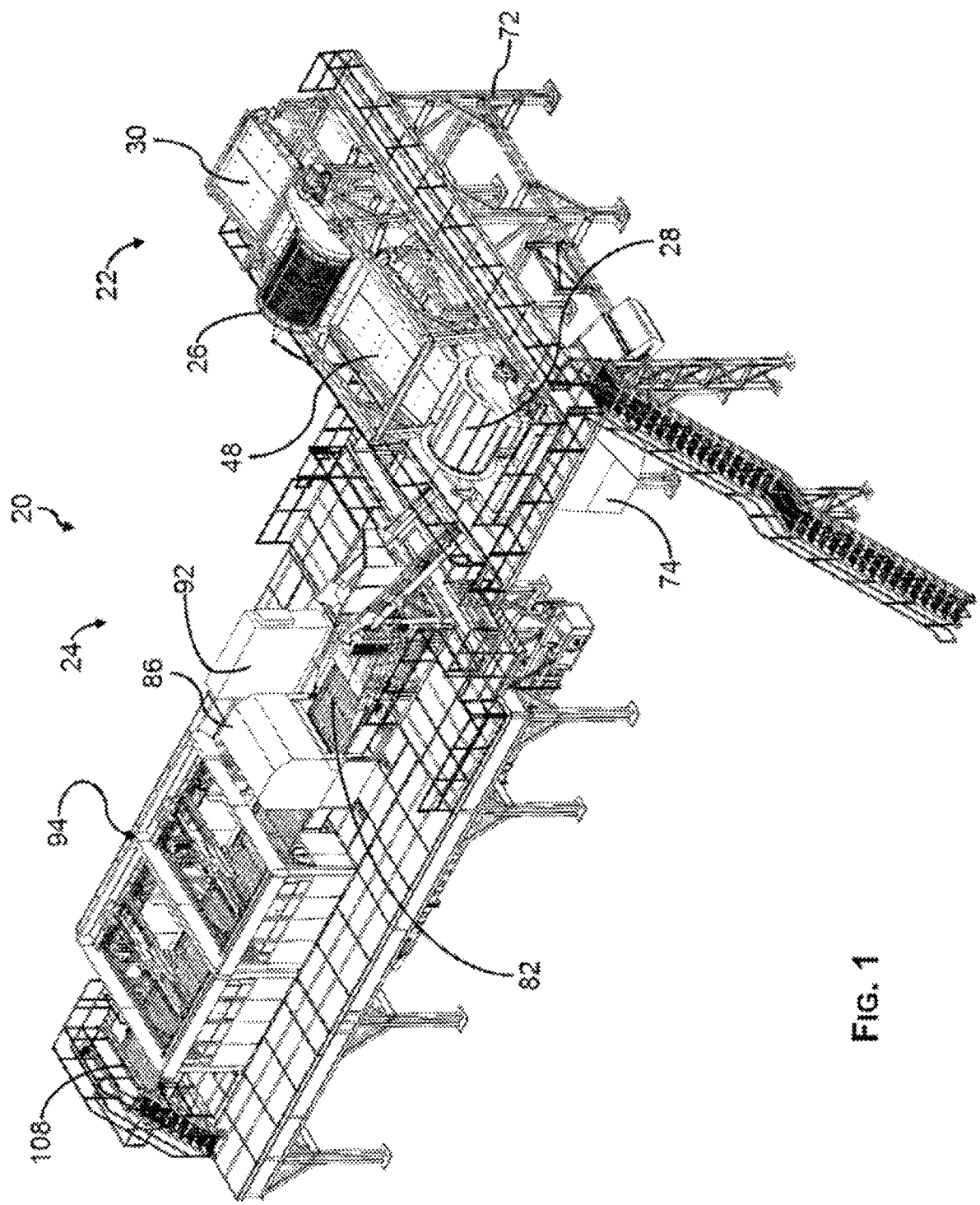
FIG. 1 is a perspective view of a system for processing scrap material
Figure 2:
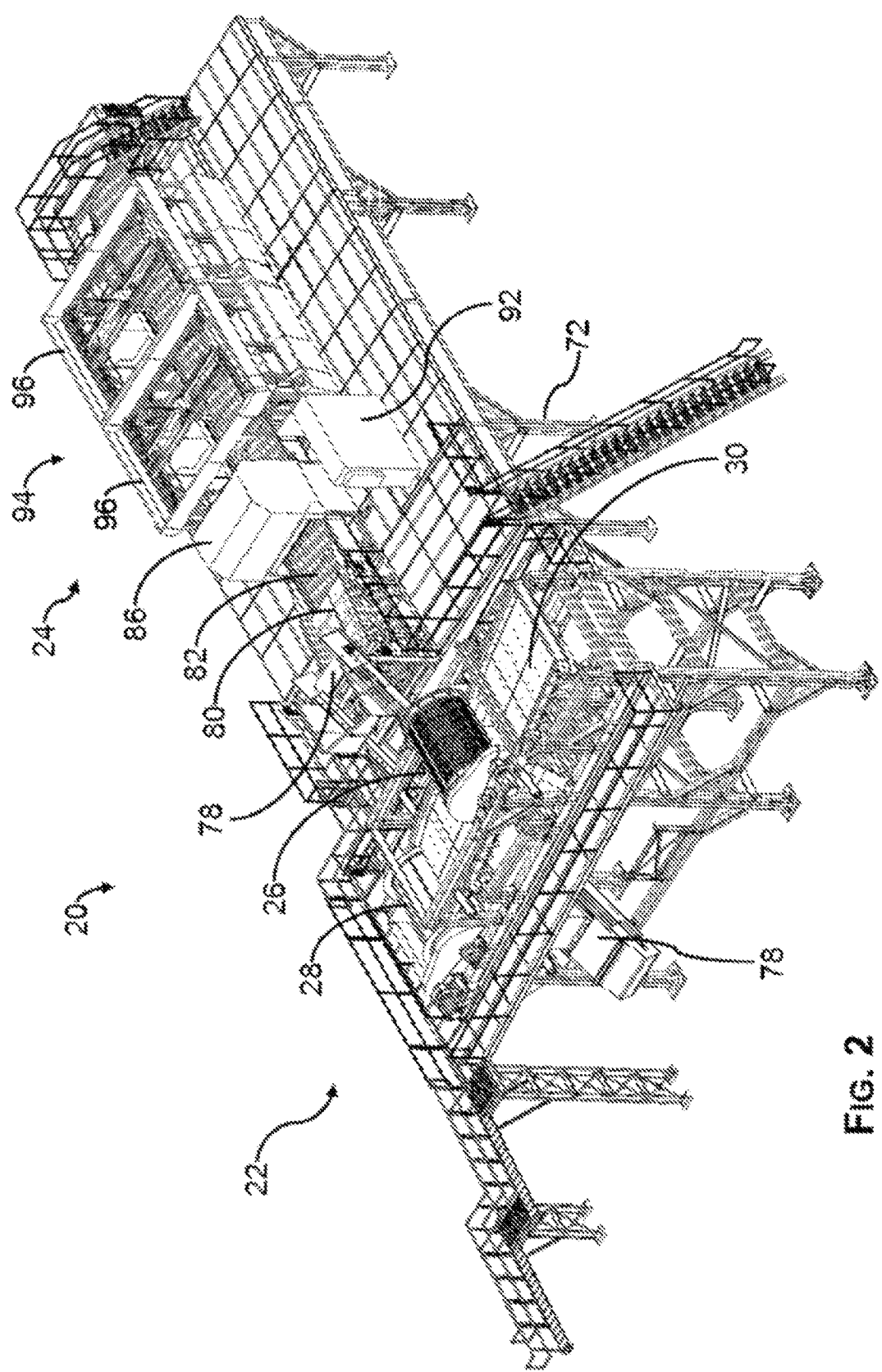
FIG. 2 is another perspective view of the system of FIG. 1.
Figure 3:
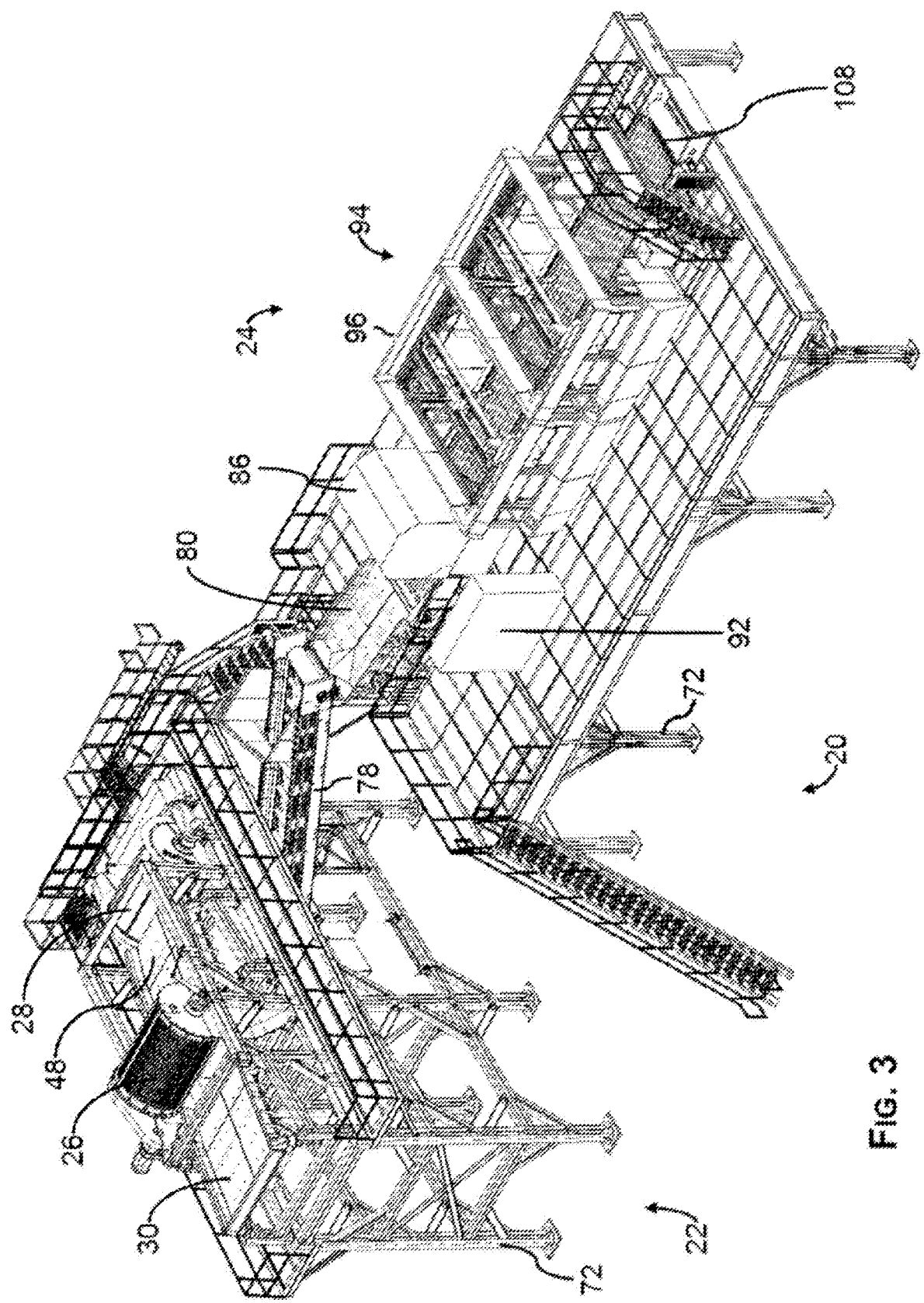
FIG. 3 is another perspective view of the system of FIG. 1.
Figure 4:
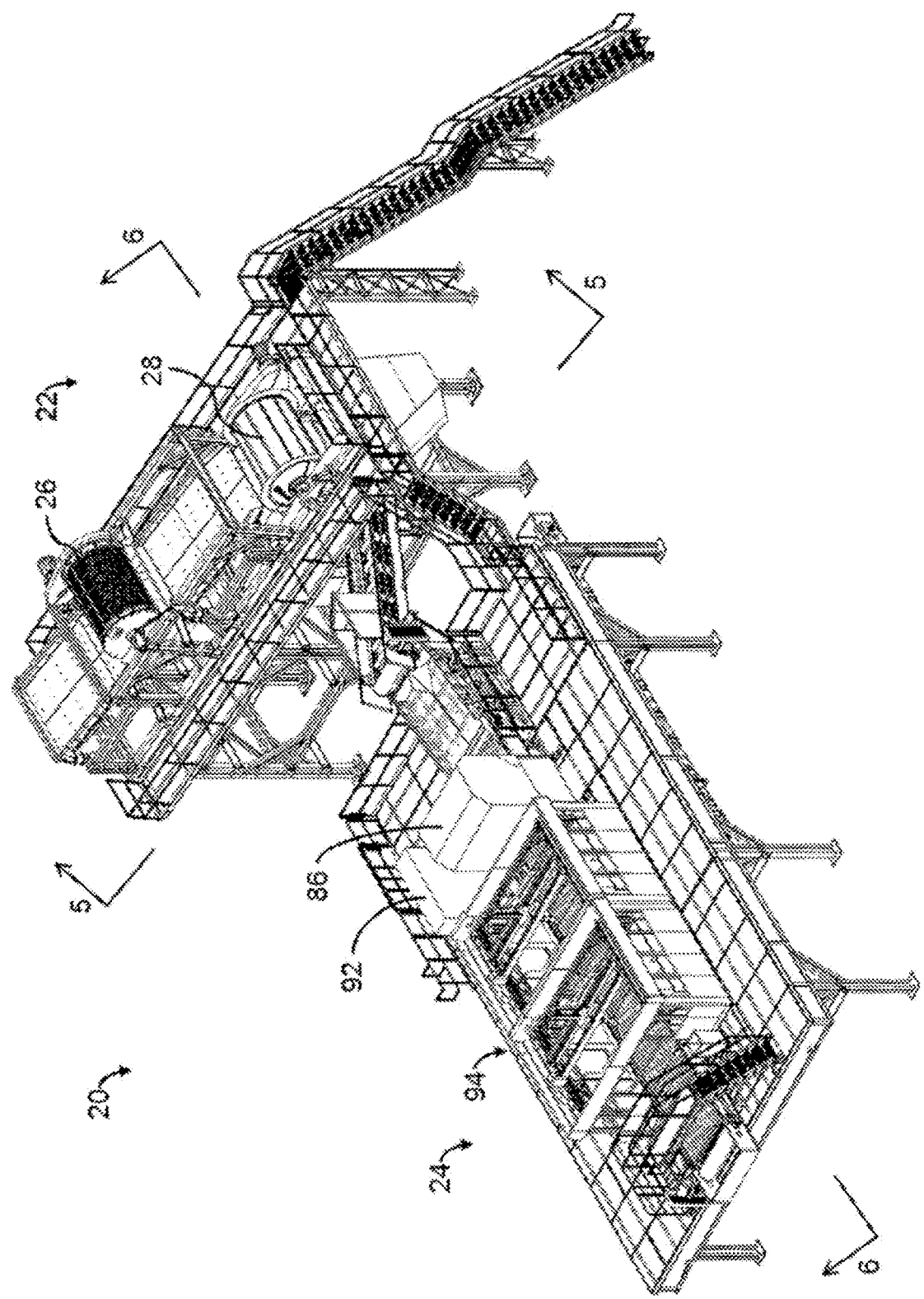
FIG. 4 is another perspective view of the system of FIG. 1.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION

A system 20 for processing scrap material is illustrated in FIGS. 1-10. System 20 includes a drum separator section 22 and a robotic picker section 24. While the use of a robotic picker is advantageous, alternative embodiments could omit the robotic picker section 24.

The illustrated drum separator section 22 includes a permanent magnet drum separator 26 and a variable-power electromagnetic drum separator 28, however, alternative embodiments might include only a single variable-power electromagnetic drum separator. Various other embodiments are also possible, some of which are discussed in further detail herein.

An initial supply of scrap material is generated for processing by the system. The initial supply of scrap material is advantageously generated by shredding vehicles such as automobiles and small trucks as well as other scrap. The scrap material generated by shredding vehicles contains a significant amount of ferrous material that can be used when producing steel. However, the initial supply of scrap material generated by shredding vehicles also contains non-ferrous materials which must be reduced to acceptable levels before the ferrous metal material can be used in the production of steel or other ferrous metal containing alloys.

The illustrated drum separator section 22 includes a first vibratory pan 30 that has an elevated end 32 which receives the initial supply of scrap material. The scrap material slides down vibratory pan 30 toward the lower second end 34 where it free falls off of end 34. As the scrap material slides along pan 30, the vibratory motion of pan 30 facilitates the separation of the individual pieces of scrap material and downward movement of the scrap material toward end 34. Arrow 36 in FIG. 5 indicates the movement of material along vibratory pan 30 toward lower end 34.

Figure 5:
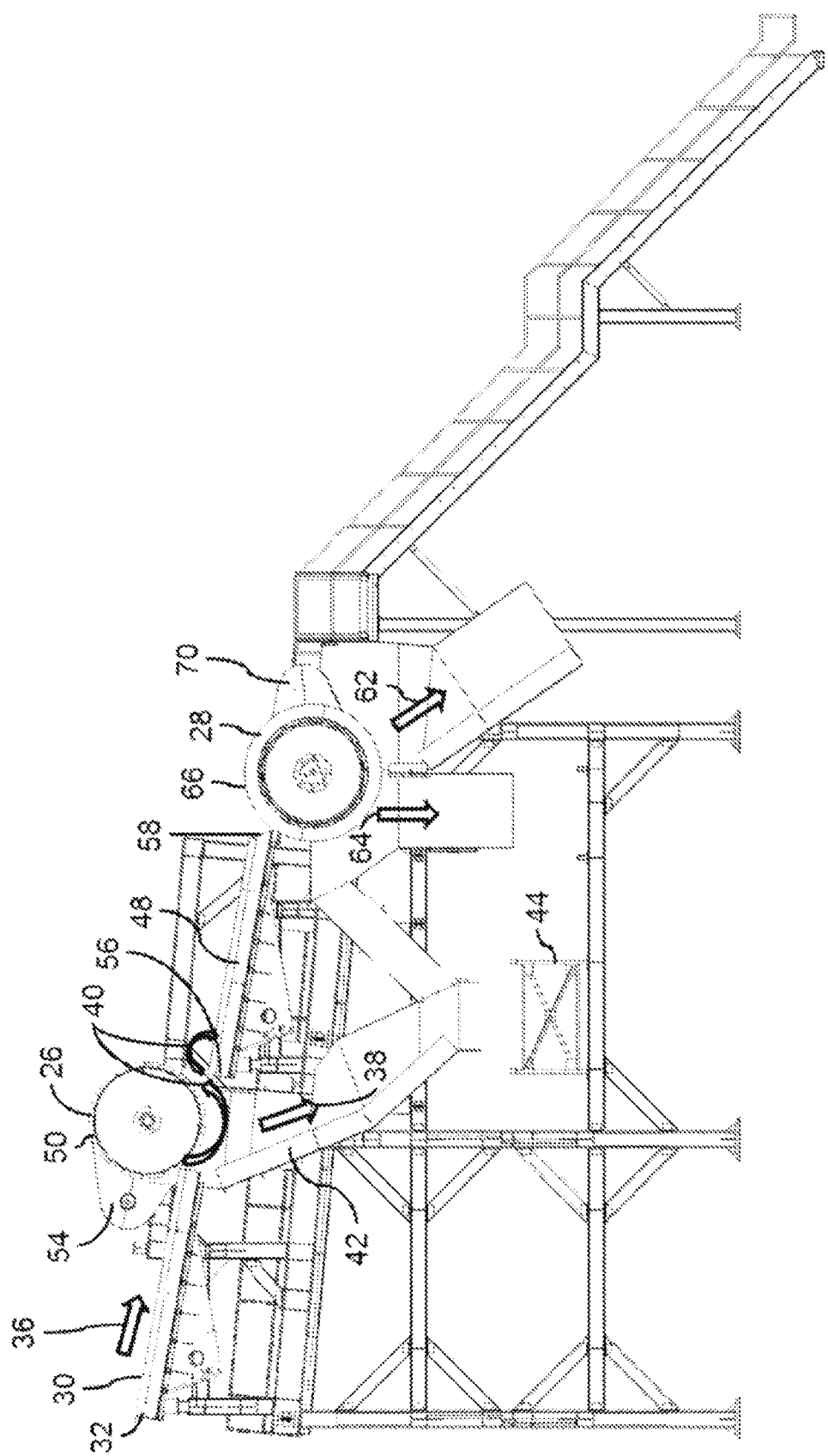
FIG. 5 is a cross sectional view taken along line 5-5 of FIG. 4.

After the scrap material is conveyed to end 34 toward the magnetic drum separator 26, the scrap material free falls from end 34 proximate the magnetic drum separator 26. In the illustrated embodiment, the scrap material free falls from end 34 at a vertical height that is below the rotational axis 46 of drum separator 26. Ferrous materials within the free-falling scrap material are attracted to drum separator 26. Some of the material attracted to drum separator may also include some non-ferrous materials. For example, some pieces of the scrap material may include both ferrous and non-ferrous materials, or, some purely non-ferrous materials may be trapped against drum separator by ferrous materials that are magnetically attracted to drum separator 26. Much of the non-ferrous material in the initial supply of scrap material, however, will continue to free fall where it is collected for disposal or other appropriate usage. Arrows 38 in FIG. 5 indicate the falling motion of non-ferrous material at drum separator 26. As can be seen in FIG. 5, a chute structure 42 can be used to guide the non-ferrous materials to a collection bin 44. Arrows 40 indicate the motion of shredded scrap material separated from the non-ferrous materials separated into collection bin 44.

The ferrous metal containing shredded scrap material is attracted to drum separator 26 and is carried under the rotational axis 46 of drum separator 26 and then deposited on a second vibratory pan 48. In the illustrated embodiment, drum separator 26 is a permanent magnet drum separator which has a plurality of permanent magnets disposed within the shell of the drum. The outer shell 50 is rotated by a motor 52 and gearing assembly 54. As outer shell 50 is rotated, it carries the magnetically attracted material along with it. The permanent magnets disposed within outer shell 50 remain stationary and, thus, the zone of magnetic attraction remains fixed relative to vibratory pans 30, 48 as outer shell 50 rotates. The drum conveys material falling off of the lower edge 34 of first vibratory pan 30 and releases the material above the elevated end 56 of the second vibratory pan 40 to thereby deposit the material magnetically attracted to drum separator 26 onto the second vibratory pan 40.

Figure 11:
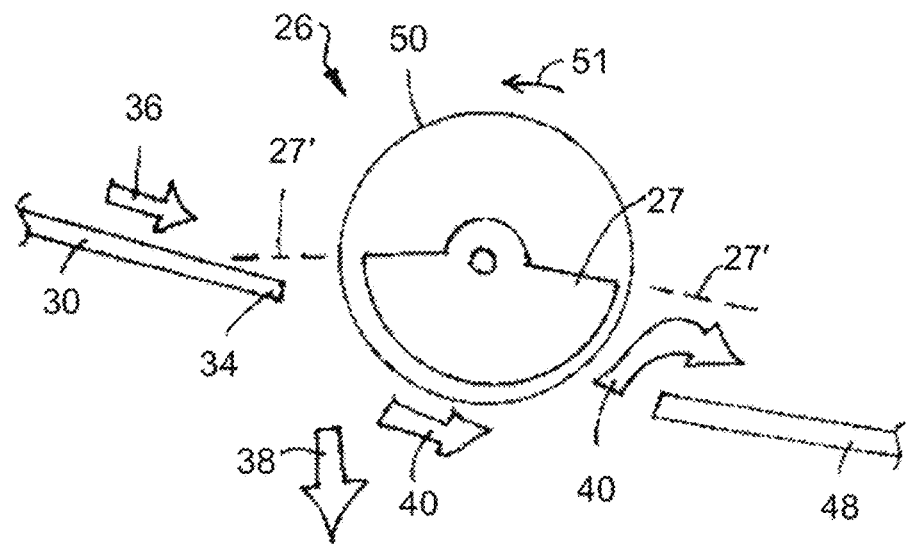
FIG. 11 is a schematic representation of a magnetic drum separator.

FIG. 11 schematically depicts the operation of magnetic drum separator 26. As can be seen in FIG. 11, the scrap material approaches drum separator 26 on vibratory pan 30 and falls from end 34. Arrow 38 represents the continued free fall of the non-ferrous material that is not attracted to drum separator 26. The outer shell 50 of drum separator rotates in the counterclockwise direction as viewed in FIG. 11 as indicated by arrow 51. The stationary permanent magnet assembly 27 is disposed within shell 50 and remains stationary. Dashed lines 27' indicate the boundaries of the magnetic field generated by magnet assembly 27. In other words, ferrous material is attracted toward shell 50 within the boundaries 27' proximate the magnet assembly 27 but is not attracted toward shell 50 along the other areas of the drum separator 26. Thus, the ferrous material falls onto vibratory pan 48 after being carried under the rotational axis of drum separator 26. Arrows 40 indicate the motion of ferrous materials attracted to drum separator 26.

System 20 is configured such that as outer shell 50 rotates (in a counterclockwise direction as viewed in FIG. 5), it carries the ferrous materials, attracted from the initial supply of scrap material free falling from edge 34, under its rotational axis 46 before dropping the material onto second vibratory pan 48 and thereby separating the attracted material from the fraction of non-magnetic materials. Thus, permanent magnet drum separator 26 is used to process the initial supply of scrap material upstream of electromagnetic drum separator 28, with the magnetic drum separator 26 separating non-magnetic materials from the initial supply of scrap material to thereby divide the initial supply of scrap material into two fractions, (i) a non-magnetic material fraction that is separated and collected in collection bin 44 and (ii) the shredded scrap material transported toward the electromagnetic drum separator along vibratory pan 48.

Second vibratory pan 48 transports the shredded scrap material separated by drum separator 26 toward variable-power electromagnetic drum separator 28 from its elevated end 56 to its lower end 58. The vibrations of pan 48 facilitate the separation of individual pieces of the shredded scrap material and also facilitate the downward sliding of the material along pan 40 to lower end 58. When the shredded scrap material reaches lower end 58 it is allowed to free fall proximate electromagnetic drum separator 28.

In the illustrated embodiment, the shredded scrap material begins to free fall from the lower end 58 at a vertical height that is located above rotational axis 60 of drum separator 28. A first fraction of the free-falling shredded scrap material is attracted to electromagnetic drum separator 28 and is carried under rotational axis 60 of electromagnetic drum separator 28 by rotation of drum separator 28. This separates the first fraction of shredded scrap material from a second fraction of the shredded scrap material which continues to free fall.

In FIG. 5, arrows 62 represent the path of the first fraction of material that is attracted to drum separator 28 while arrows 64 represent the path of the second fraction of material that continues to free fall after dropping from lower end 58 of second vibratory pan 48. The outer shell 66 of drum separator 28 rotates in a counterclockwise direction when viewed as shown in FIG. 5.

Figure 12:
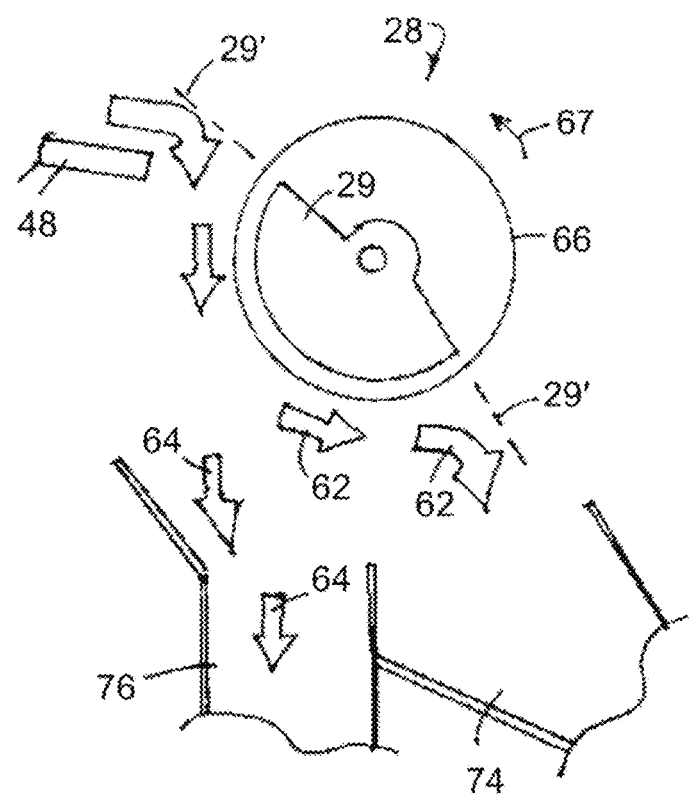
FIG. 12 is a schematic representation of another magnetic drum separator.

Similar to drum separator 26, it is only the outer shell that rotates and the electromagnetic assembly disposed within drum separator 28 remains stationary. As a result, the magnetic field generated by the electromagnetic assembly also remains stationary relative to second vibratory pan 48 and the support structure 72 of system 20. FIG. 12 provides a schematic representation of the operation of electromagnetic drum separator 28. Shredded scrap material approaches drum separator 28 on vibratory pan 48 and free falls from its edge. Drum separator 28 includes an outer shell 66 which rotates in the counterclockwise direction as viewed in FIG. 12 and as represented by arrow 67. A variable-power electromagnetic assembly 29 is disposed within shell 66 and remains stationary. Assembly 29 generates a magnetic field that attracts ferrous material to outer shell 66 where assembly 29 is disposed proximate shell 66. Dashed lines 29' show the effective boundaries of this attractive magnetic field. The movement of the ferrous materials attracted to outer shell 66 by the magnetic field are designated by arrows 62 while the movement of the materials which are not attracted by the magnetic field are designated by arrows 64. As schematically depicted in FIG. 12, the arcuate extent of the magnetic field generated by electromagnetic assembly 29 is such that the ferrous material is carried to a point above chute 74 where it hits the limit of the magnetic field and then falls into chute 74. The material not attracted to shell 66 by the magnetic field falls directly into chute 76.

Motor 68 drives the rotation of outer shell 66 through a gearing assembly 70. In the illustrated embodiment, drum separator 28 is a variable-power, axial pole, electromagnetic drum separator. In the illustrated embodiment, electromagnetic drum separator 28 is arranged such that the magnetic field attracts ferrous material falling from lower end 58 and continues to attract the ferrous material as it rotates under rotational axis 60 with the magnetic field being discontinued at a point above chute structure 74 thereby causing the attracted ferrous materials to no longer be attracted to drum separator 28 at a point above chute structure 74. The ferrous materials attracted to electromagnetic drum separator 28 forming the first fraction of the free-falling shredded scrap material are thereby directed into chute structure 74 while the second fraction of shredded scrap material free-falling from lower end 58 of vibratory pan 48 which is not diverted by drum separator 28 continues to free fall into chute structure 76. As a result of the operation of drum separator 28, the first fraction of material falling into chute structure 74 will be a low-copper ferrous material with the second fraction of material falling into chute structure 76 having a higher copper content than the first fraction. Copper is the primary non-ferrous material of most concern in shredded scrap material which is why the first fraction is referred to as a low-copper shredded ferrous material.

The use of a variable-power electromagnetic drum separator allows the magnetic field strength of the electromagnetic drum separator to be adjusted. This ability to adjust the magnetic field strength coupled with the arrangement of drum separator 28 so that the attracted material is carried below rotational axis 60 of drum separator 28 instead of over rotational axis 60, allows system 20 to be used to generate a first fraction of material (that fraction directed through chute 74) of exceptional high-quality ferrous scrap material with very little copper material.

While electromagnetic drum separators are known in the art, the known electromagnetic separators are operated with the goal of attracting all ferrous material to the drum and depositing all of the ferrous material in the same place. Carrying the ferrous material under the rotational axis of an electromagnetic drum separator allows some of the attracted material to fall from drum before it is carried to the intended drop point of the magnetically attracted material, which deposits the ferrous materials (some of which are bearing copper and other non-ferrous materials) in two places. This is generally considered undesirable. System 20, however, uses variable-power electromagnetic drum separator 28 in a unique and novel fashion to take advantage of this result and thereby produce an exceptionally high-quality ferrous scrap material, i.e., the first fraction directed through chute structure 74.

The provision of such a high-quality ferrous scrap material is capable of providing substantial benefits. Much of the ferrous scrap material currently generated is used to produce steel feedstock for steel mills. The amount of non-ferrous (copper) material in the scrap feedstock limits the amount of scrap material that can be used by the steel mills and increases the required amount of virgin material that must be used when producing steel. For example, if the steel mill can only use up to 20% scrap material having an X % of non-ferrous material and must use 80% virgin material to produce steel having an acceptably low percentage of non-ferrous (copper) content, such steel could use up to 40% scrap material that has a non-ferrous content of only X/2%. Thus, by reducing the non-ferrous (copper) content of the first fraction of scrap material being generated by system 20, a steel producer can utilize a higher percentage of scrap material in its steel without degrading the quality of the steel.

The second fraction of material processed at drum separator 28 is allowed to free fall into chute structure 76. Variable-power electromagnetic drum separator 28 is adjusted so that the magnetic field strength of drum separator 28 allows some of the ferrous material to fall into chute structure 76 with the second fraction of material. By adjusting the magnetic strength of drum separator 28 to allow some ferrous material to not be captured by its magnetic field, those parts that are captured and routed with the first fraction into chute structure 74 will be less likely to include ferrous material that is entangled with non-ferrous materials or part of a single component that includes both ferrous and non-ferrous materials, thereby improving the quality of the first fraction routed into chute structure 74.

In this regard, it is noted that shredded scrap material, such as that generated by shredding vehicles, often contain electric machines in the form of motors and/or generators. These electric machines often include stators and rotors that are formed by ferrous metal cores and copper windings where the copper windings are disposed in slots or openings in the ferrous metal cores. The copper windings generally remain attached to the ferrous metal cores in the shredding process. When the ferrous metal core is attracted by a magnetic field when processing the scrap, the copper windings are also attracted due to their entanglement with the ferrous metal core. These ferrous metal cores having copper windings are oftentimes referred to as meatballs in the scrap processing industry and, due to the non-ferrous copper windings, it is undesirable for these meatballs to be included with the ferrous metal fraction of the processed scrap material. Advantageously, the magnetic strength of drum separator 28 is adjusted so that these meatballs are allowed to continue their free fall and are included in the second fraction of material which is directed into chute structure 76.

Chute structure 74 directs the high-quality, low-ferrous first fraction of material processed by drum separator 28 into a bin (not shown) or similar structure. When the bin has been filled, a forklift or similar equipment can be used to move the full bin for later transport to a customer and replace it with an empty bin. The second fraction of material, having a higher non-ferrous content, is directed by chute structure 76 onto a conveyor belt 78. Conveyor belt 78 transports the second fraction of material to robotic picker section 24 as best seen in FIG. 6.

Figure 6:
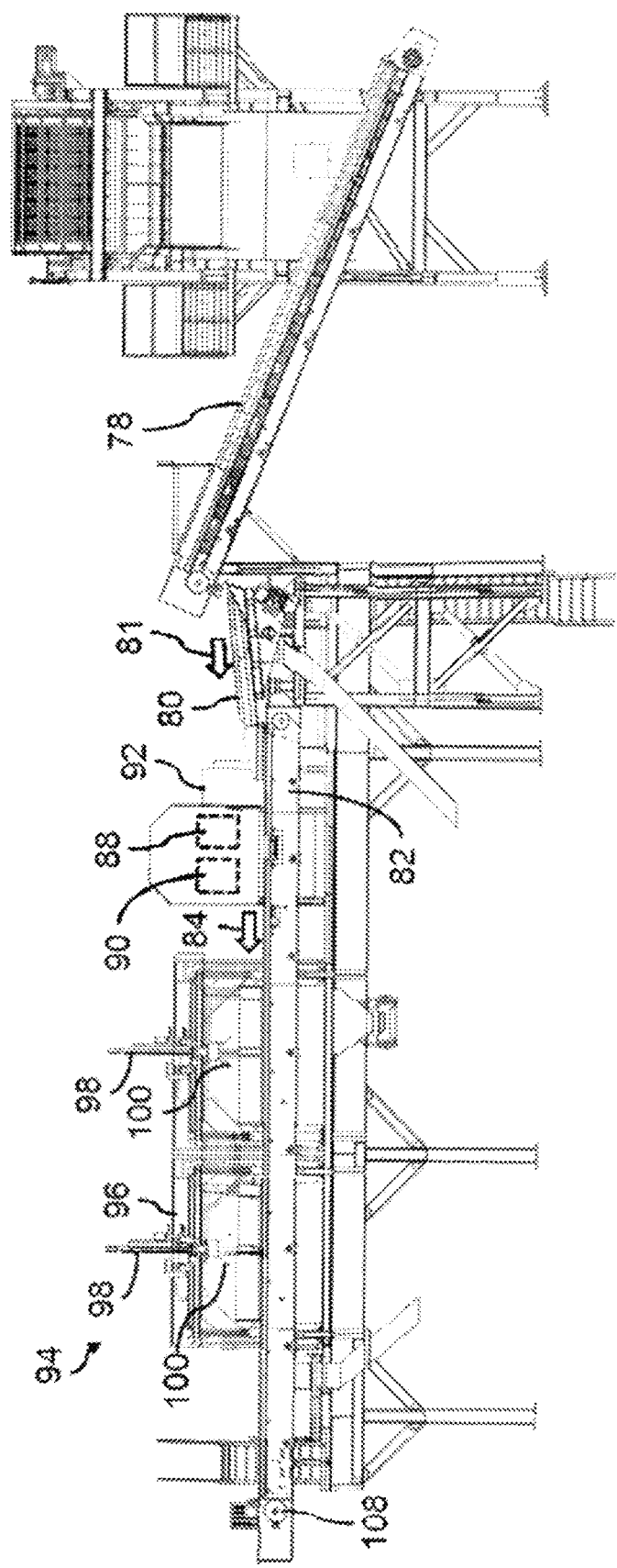
FIG. 6 is a cross sectional view taken along line 6-6 of FIG. 4.
Figure 7:
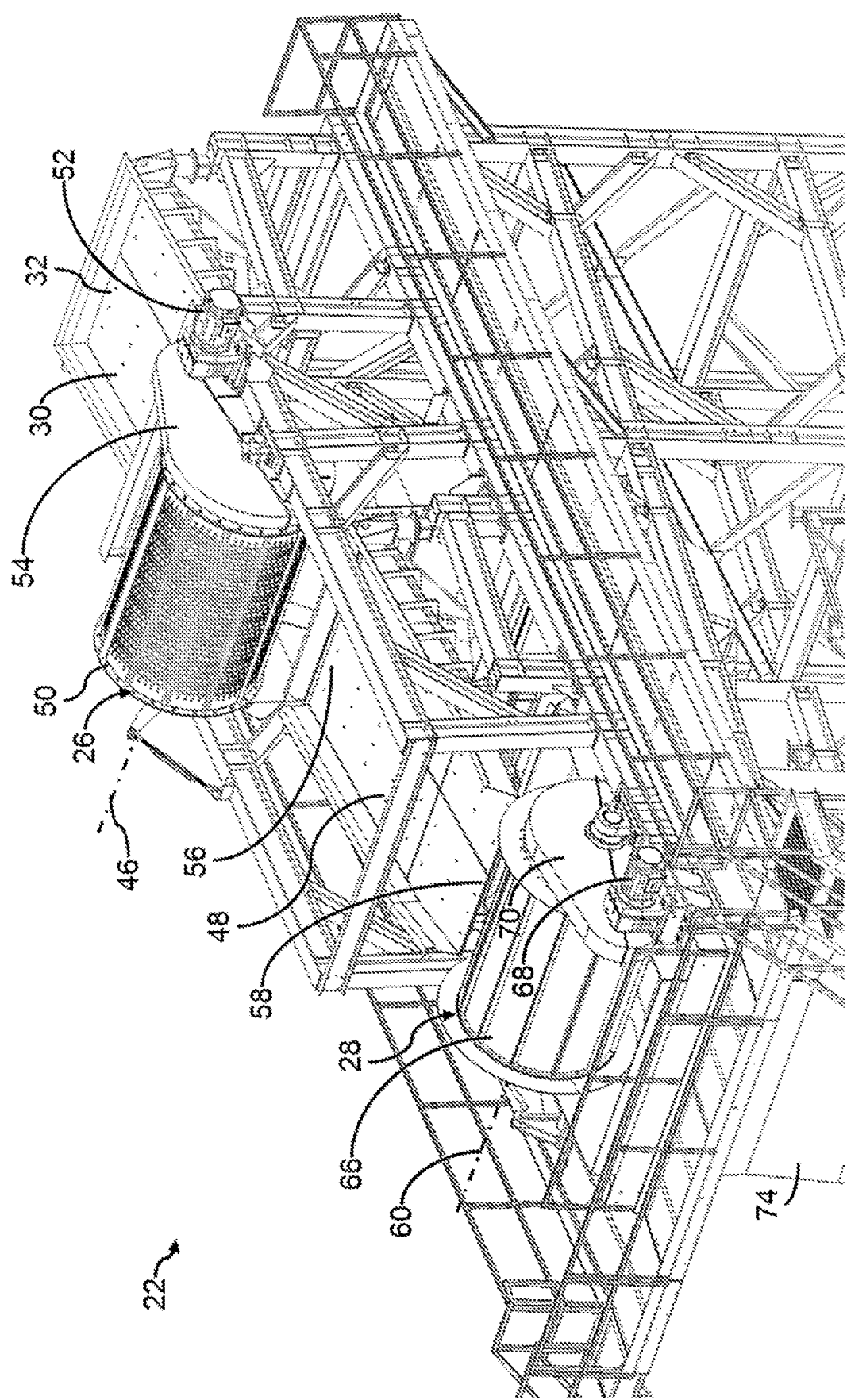
FIG. 7 is a detail perspective view of the drum separator section of the system of FIG. 1.
Figure 8:
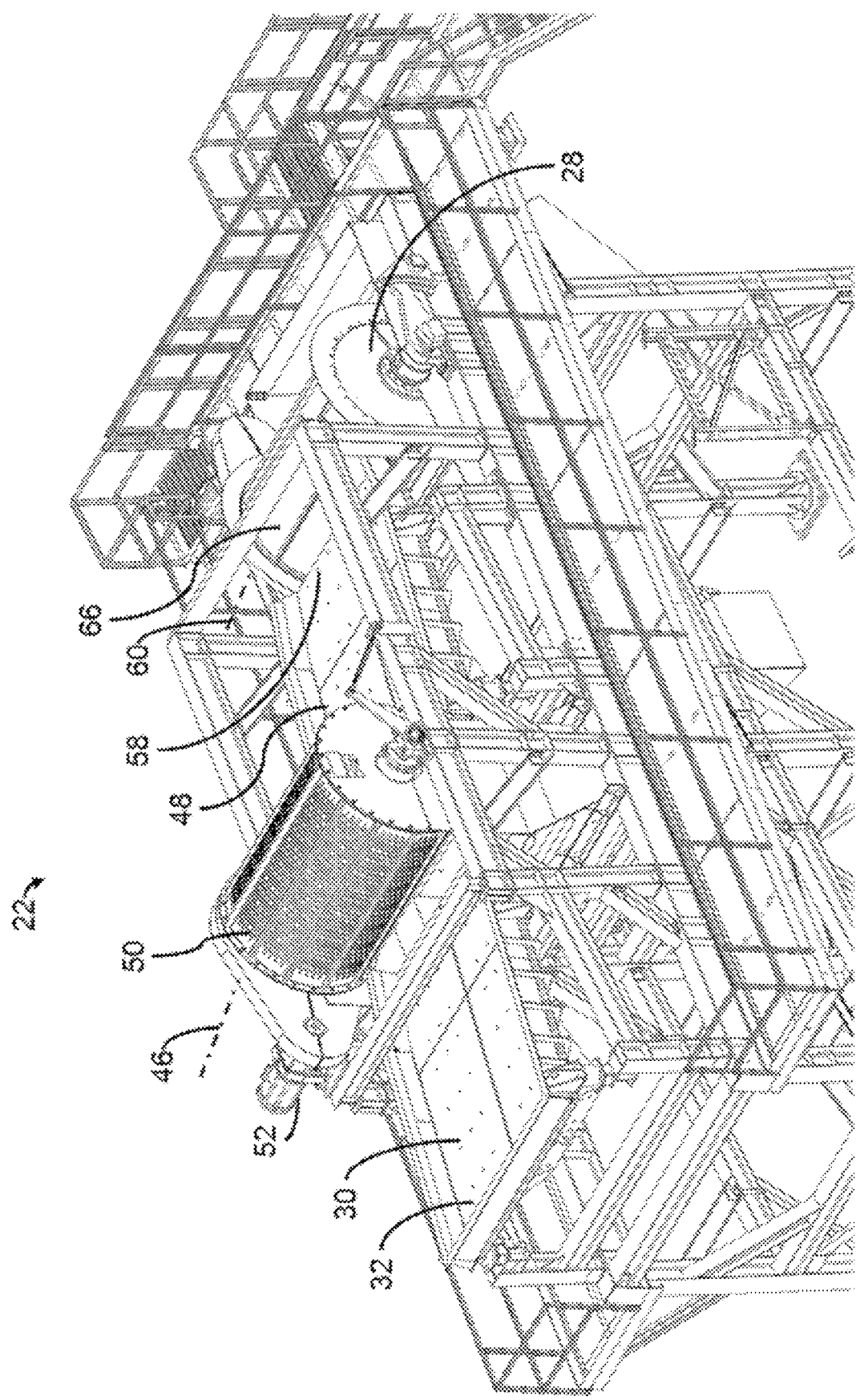
FIG. 8 is another detail perspective view of the drum separator section of the system of FIG. 1.
Figure 9:
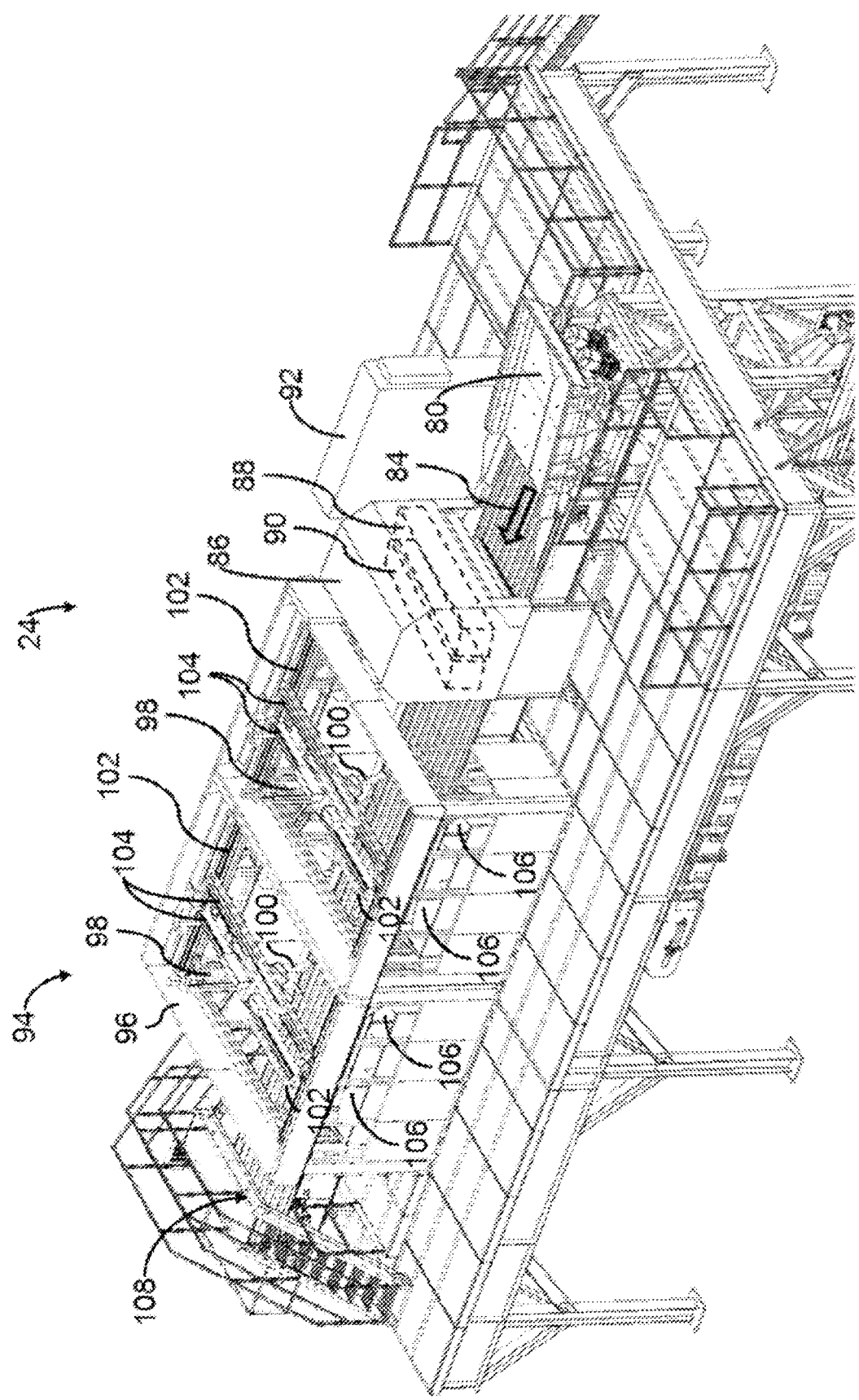
FIG. 9 is a detail perspective view of the robotic picker section of the system of FIG. 1.
Figure 10:
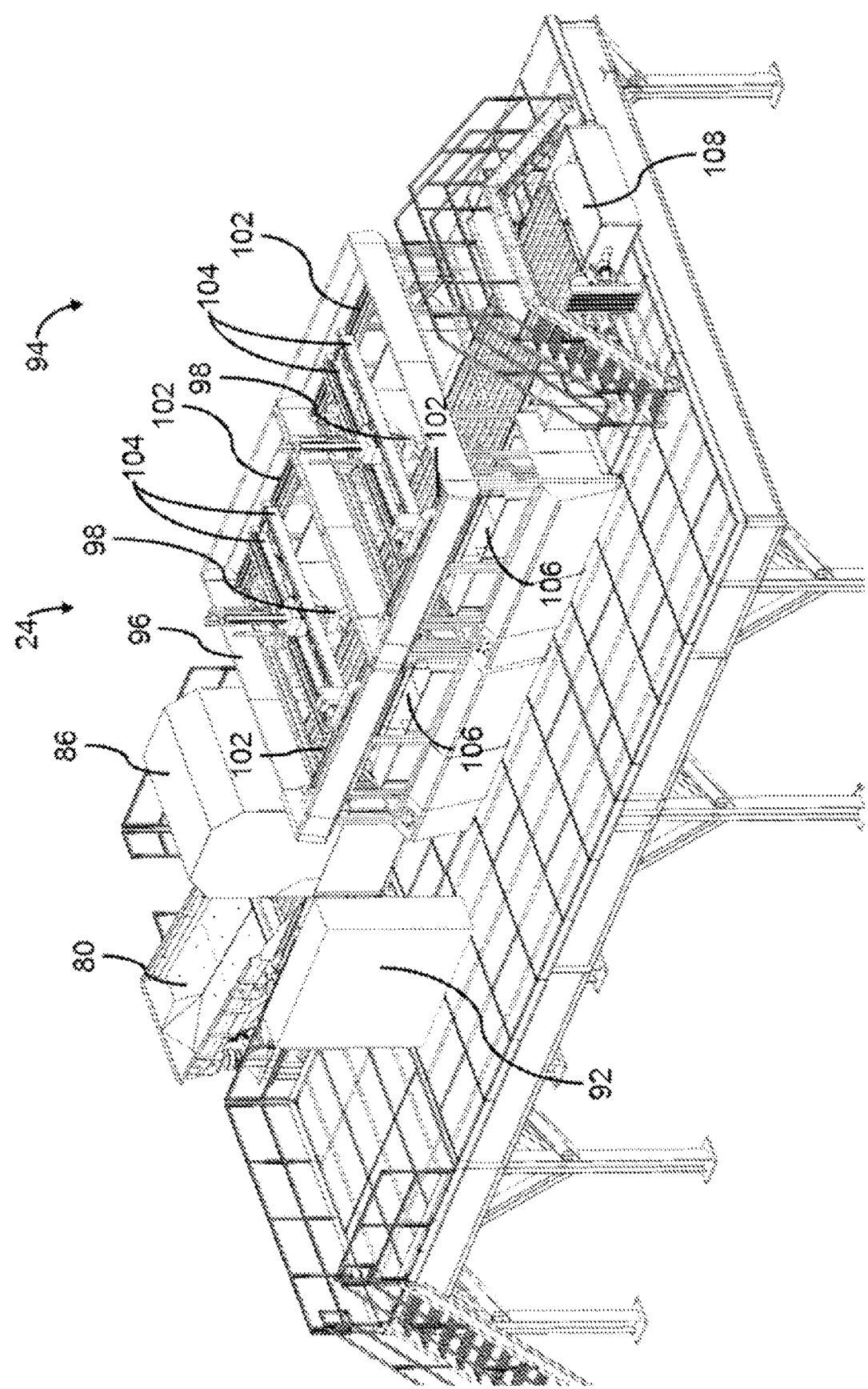
FIG. 10 is another detail perspective view of the robotic picker section of the system of FIG. 1.

Robotic picker section 24 is best understood with reference to FIGS. 6, 9 and 10. Conveyor belt 78 lifts and transports the second fraction of material separated at drum separator 28 to a point where it is dropped onto the upper end of a third vibratory pan 80. The vibrations of vibratory pan 80 facilitate the separation of the individual pieces of scrap material and also facilitate the sliding movement of the scrap material down vibratory pan 80 as indicated by arrow 81. After sliding down vibratory pan 80, the scrap material falls onto conveyor belt system 82. Conveyor belt system 82 conveys the material in the direction indicated by arrow 84.

The scrap material on conveyor belt 82 passes under sensor housing 86. One or more sensors are disposed in housing 86 and are used to distinguish different materials being conveyed. The sensors 88, 90 may take the form of a digital camera system, an induction sensor bar, a near infrared camera, and/or a 3-dimensional laser measuring sensor as schematically depicted in FIG. 9. An x-ray fluorescence sensor could also be employed. The images/data acquired by the sensors is communicated to a control system 92 which analyzes the data and communicates control signals to robotic picker assembly 94.

Robotic picker assembly 94 includes two automated robotic pickers for removing copper and other undesirable materials from the second fraction of material being transported on conveyor belt 82. Each of the robotic pickers includes a gantry structure 96 which moveably supports a robotic arm 98 having grasping member 100 on the lower end of robotic arm 98.

Each of the gantry structures 96 includes a pair of longitudinal parallel rails 102 that extend in a longitudinal direction that is the same direction that conveyor belt 82 moves, i.e., in the same direction as arrow 84. Each robotic picker also includes a pair of parallel lateral rails 104 that extend between longitudinal rails 102 and which are longitudinally movable along rails 102. The lateral rails 104 support vertically extending robotic arm 98 with robotic arm 98 being laterally movable along rails 104 in a direction transverse to arrow 84. Robotic arms 98 are also vertically moveable relative to the rails 104 on which they are mounted. Thus, each of the grasping members 100 is moveable in three mutually perpendicular directions.

After sensors 88, 90 communicate sensed data to control system 92, control system 92 analyzes the data to categorize the different pieces of scrap material and determine which pieces should be removed by the robotic pickers. The sensed data is also analyzed to determine the position of the scrap material on conveyor belt 82. Control system 92 also monitors and controls the motion of conveyor belt 82. Control system 92 controls the movement and operation of robotic arms 98 to grasp and remove selected individual pieces of scrap material from conveyor belt 82 as it transports the scrap material below the robotic arms 98. The robotic arms 98 carry the selected items to bins 106 located alongside conveyor belt 82 and drop the items into the bins. The unselected pieces of scrap material are conveyed to the end 108 of conveyor belt system 82 where they fall into a collection bin (not shown) positioned on the ground surface.

A variety of different materials may be distinguished by sensors 88, 90 and separated by robotic picker assembly 94. For example, there may be pieces of copper material, often referred to as free copper, that can be picked by arms 98 and placed in one of the bins 106 for copper. Some of the items may have no value and are picked and placed in a separate one of the bins 106 for later disposal. Each of the two arms has the capability of separately placing pieces of scrap into one of four different bins and, thus, robotic picker arm assembly 94 could be used to separate eight different types of material from the second fractions and, if the material collected at the end of conveyor belt 82 is counted, that means nine different types of material could be separated from the second fraction in the illustrated embodiment. In most applications, only a few different types of material will be separated. For example, a system might select: i) free copper material, e.g., pieces of material consisting of almost exclusively copper material; ii) other non-ferrous metal pieces; iii) items for disposal; and iv) electric machine rotors and stators having a ferrous metal core and copper windings, i.e., meatballs.

When the illustrated system 20 is used to process shredded vehicles, much of the second fraction of material will be ferrous metal material that is allowed to drop off the end 108 of conveyor belt 82. The use of robotic picker assembly 94 will reduce the non-ferrous content of this ferrous scrap material. It is unlikely that the ferrous scrap material dropping off the end 108 of conveyor belt 82 will have the same quality as the first fraction of ferrous material separated at drum separator 28, but it will likely have a content that will make it a valuable ferrous metal scrap material with an acceptably low non-ferrous content.

As briefly touched on above, by adjusting the magnetic field strength of drum separator 28 to drop electric machine rotors and stators having a ferrous metal core and copper windings, i.e., meatballs, into the second fraction of material transported to the robotic picker section 24, these meatballs can be identified by sensors 88, 90 and removed by the robotic picker assembly 94 without employing any manual labor to remove these meatballs. Similarly, the other materials removed by robotic picker assembly 94 are removed without the use of manual labor. However, in the absence of a robotic picker assembly, human pickers can be used to complete this task.

Thus, it will be recognized that the disclosed system 20 provides for an advantageous method of processing scrap material. In one form, this method includes processing a shredded scrap material with an electromagnetic drum separator formed by a variable-power electromagnetic drum separator 28 having a rotational axis 60 wherein shredded scrap material is transported toward the electromagnetic drum separator and is placed in free fall at a position proximate the electromagnetic drum separator; attracting to the electromagnetic drum separator 28 a first fraction of the shredded scrap material and rotating the electromagnetic drum to carry the first fraction of the shredded scrap material under the rotational axis 60 of the electromagnetic drum separator 28 (indicated by arrows 62) to thereby separate the first fraction of the shredded scrap material from a second fraction of the shredded scrap material which continues to free fall from the position proximate the electromagnetic drum separator 28 (indicated by arrows 64) and wherein the first fraction is a low-copper ferrous material with the second fraction having a higher non-ferrous content than the first fraction; and adjusting the strength of the magnetic field of the electromagnetic drum separator to achieve a desired non-ferrous and/or copper content in the first fraction of the shredded scrap material.

The method may also include processing an initial supply of scrap material upstream of the electromagnetic drum separator 28 with a magnetic drum separator 26 wherein the magnetic drum separator defines a second rotational axis 46 and includes permanent magnets by attracting ferrous material from the initial supply of scrap material with the permanent magnets and carrying the attracted material under (or over) the second rotational axis 46 by rotation of the magnetic drum separator (indicated by arrows 40) to thereby separate the attracted material from a non-magnetic material fraction; and transporting the attracted material toward electromagnetic drum separator 28 whereby it forms the shredded scrap material processed by the electromagnetic drum separator 28.

The method may further include using a first vibratory pan 30 to transport the initial supply of scrap material toward the magnetic drum separator 26 and allowing the initial supply of scrap material to free fall from the first vibratory pan 30 proximate the magnetic drum separator 26; wherein the step of processing the initial supply of scrap material with the magnetic drum separator 26 includes attracting ferrous material from the free falling scrap material with the magnetic drum separator 26 to separate a fraction of the material to form the shredded scrap material transported toward the electromagnetic drum separator by using the magnetic drum separator to carry the shredded scrap material under (or over) the rotational axis 46 of the magnetic drum separator 26 and dropping the shredded scrap material onto a second vibratory pan 48; and using the second vibratory pan 48 to transport the shredded scrap material to the position where the shredded scrap material is allowed to free fall proximate the electromagnetic drum separator 28 and allowing the shredded scrap material to free fall from the second vibratory pan 48 at a vertical height located above the rotational axis 60 of the electromagnetic drum separator 28.

The electromagnetic drum separator 28 used in the method may be a variable-power, axial pole, electromagnetic drum separator and the method may further include adjusting the magnetic field strength of the electromagnetic drum separator 28 so that the second fraction of the stream of shredded scrap includes some ferrous material; using at least one sensor to identify copper and other undesirable materials to be removed from the second fraction wherein the at least one sensor 88, 90 includes a digital camera, an induction sensor bar, near infrared camera, and/or a 3-dimensional laser measurement sensor; and using a robotic picker 94 to selectively grab the identified material to be removed from the second fraction and removing the identified material with the robotic picker, the robotic picker including at least one gantry structure 96 for moveably supporting a robotic arm 98, the robotic arm being adapted to selectively grab the pieces of identified material and being moveable in a direction transverse to a direction of movement 84 of the second fraction.

The method may also include shredding a plurality of automobiles to generate the initial supply of scrap material.

In some embodiments, the strength of the magnetic field of the electromagnetic drum separator is adjusted so that the second fraction of the shredded scrap material includes some ferrous material. In such embodiments, the strength of the magnetic field of the electromagnetic drum separator may be adjusted so that the second fraction of the shredded scrap material includes electric machine rotors and stators which are formed by a ferrous metal core and copper windings and then using a robotic picker 94 to remove from the second fraction of the shredded scrap material any electric machine rotors and stators which are formed by a ferrous metal cores and copper windings.

Flow charts illustrating several alternative embodiments of the system and methods employed using the systems are illustrated in FIGS. 13-20.

Figure 13:
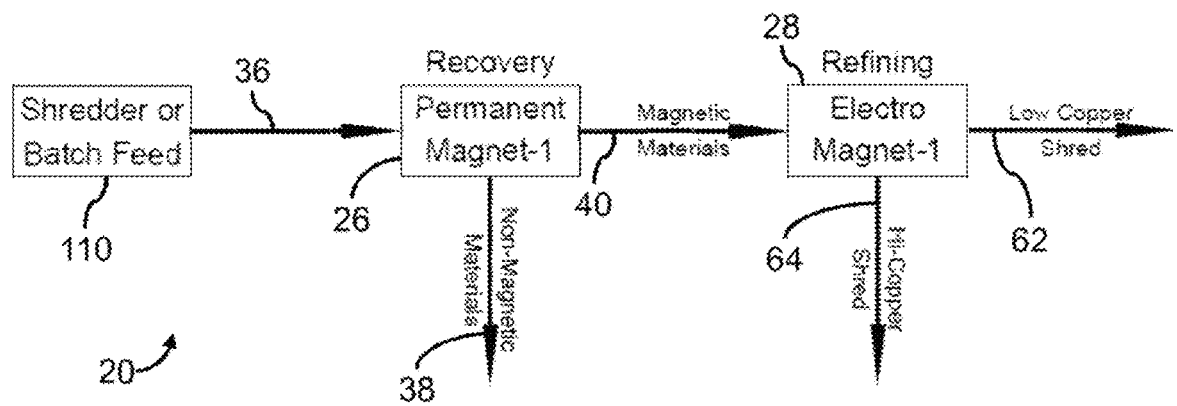
FIG. 13 is a flow diagram of the system of FIG. 1.
Figure 14:
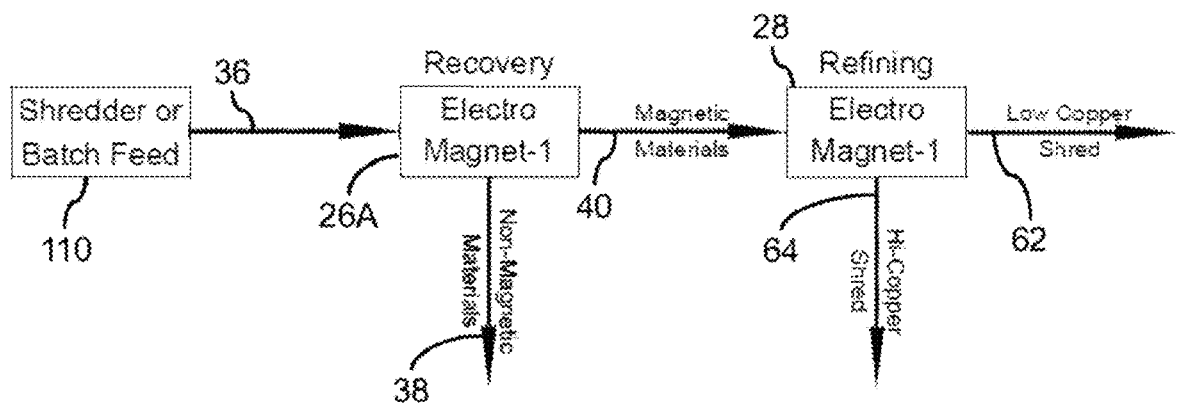
FIG. 14 is a flow diagram of an embodiment similar to the embodiment of FIG. 13 but using all electromagnetic drum separators.

FIGS. 13 and 14 illustrate systems and methods employing two magnetic recovery drums. FIG. 13 provides a flow chart illustrating the operation of system 20 depicted herein. In FIG. 13, a shredder or batch feed 110, e.g., a shredder that is used to shred vehicles, generates a stream of material that is fed to permanent magnet drum separator 26 which is also referred to herein as a magnetic recovery drum separator. It is noted that the term "recovery" is used with this drum separator to indicate that it is separating and thereby recovering ferrous (magnetic) materials from the material stream. As has been discussed above in greater detail, the shredded scrap material is then transported to the electromagnetic drum separator 28 which is also referred to herein as a refining electromagnetic drum separator. It is noted that the term "refining" is used with this drum separator to indicate that it is separating a stream of shredded scrap material into two separate fractions each of which contain ferrous material and one of which is a higher quality than the original stream of shredded scrap material that was fed to the refining drum separator.

FIG. 14 illustrates a system that is similar to that of FIG. 13 but wherein the recovery drum 26A is formed by a variable power electromagnetic separator drum instead of a permanent magnet separator drum. In this regard, it is noted that both versions of the recovery drum separator use a magnetic assembly to attract ferrous materials wherein for recovery drum 26 it is a permanent magnet assembly and for recovery drum 26A it is an electromagnetic assembly. The use of an electromagnetic drum separator for a recovery drum separator provides greater flexibility to the operator who can then adjust the strength of the magnetic attraction to obtain the desired results when recovering ferrous material from the initial stream of scrap material. This would also be useful if the same system were used to process different types of scrap material streams.

Figure 15:
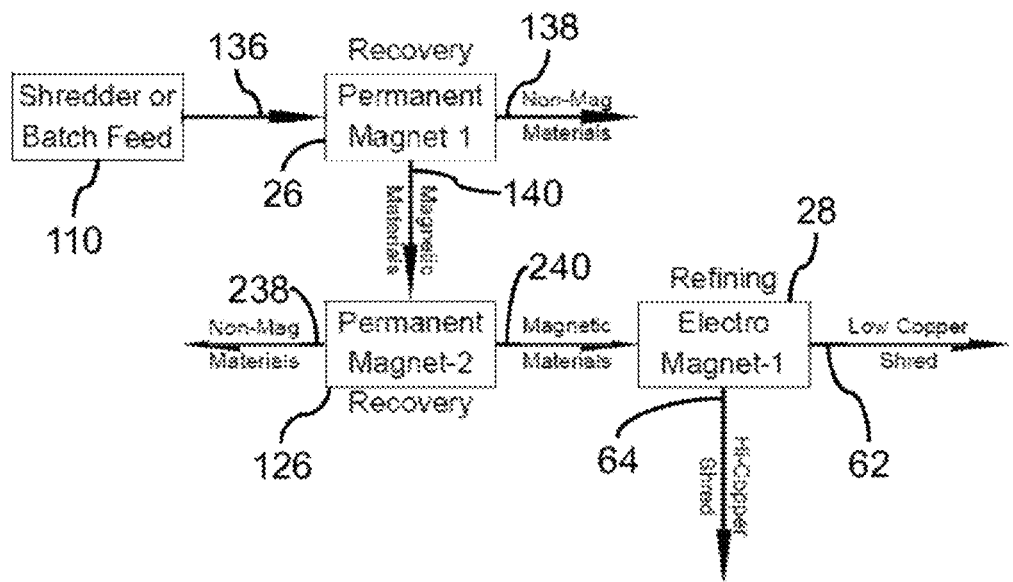
FIG. 15 is a flow diagram of an alternative embodiment having two permanent magnet recovery drum separators and a single electromagnetic drum separator for refining the ferrous material fraction.
Figure 16:
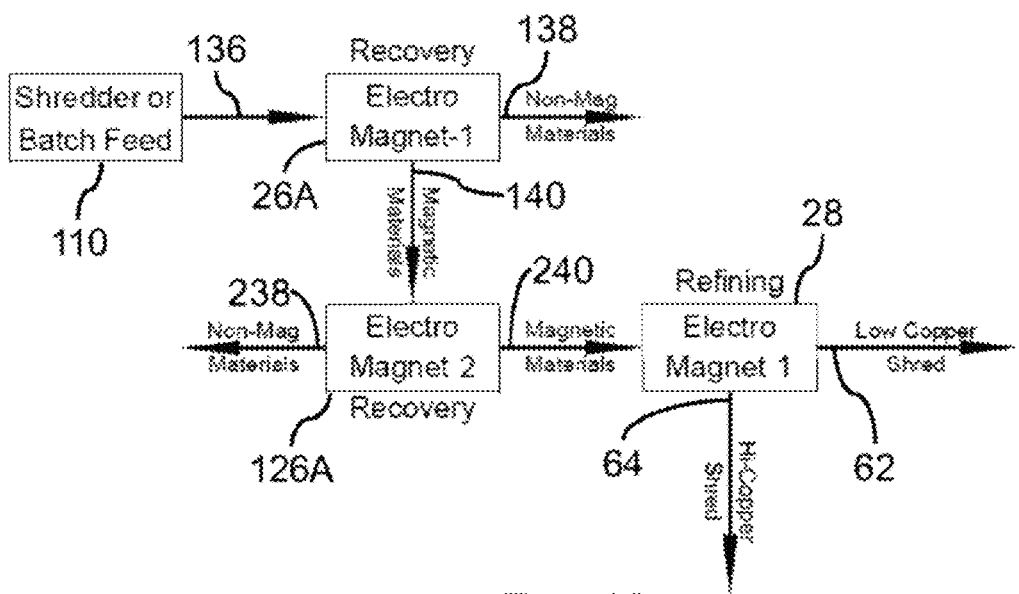
FIG. 16 is a flow diagram of an embodiment similar to the embodiment of FIG. 15 but with two electromagnetic recovery drum separators.

FIGS. 15 and 16 illustrate alternative systems using two magnetic recovery drum separators to remove non-ferrous material from the initial stream of scrap material before using an electromagnetic drum separator 28 to separate the ferrous material into different fractions. Such a system may be useful wherein the initial stream of scrap material has a relatively high quantity of non-ferrous material.

In FIG. 15, the initial stream of scrap is fed from the shredder or batch feed 110 to the first magnetic recovery drum separator 26 as indicated by arrow 136. Drum separator 26 generates a stream of non-ferrous material as indicated by arrow 138 and a stream of scrap containing the ferrous scrap material as indicated by arrow 140. The ferrous scrap material stream 140 is directed to a second permanent magnet recovery drum 126 which operates similar to drum 26. Second permanent magnet recovery drum 126 separates additional non-ferrous material as indicated by arrow 238 to thereby generate a ferrous scrap material stream that is directed to refining electromagnetic drum separator 28 as indicated by arrow 240. Thus, the two recovery drum separators are arranged serially and positioned before the refining drum separator to remove non-ferrous material before processing of the scrap material by the refining drum separator.

FIG. 16 illustrates a system that operates in the same manner as the system of FIG. 15 but utilizes two variable electromagnetic recovery drum separators 26A, 126A instead of permanent magnet recovery drum separators. It would also be possible to replace only one of the permanent magnet recovery drum separators of FIG. 15 with a variable electromagnetic recovery drum separator.

Figure 17:
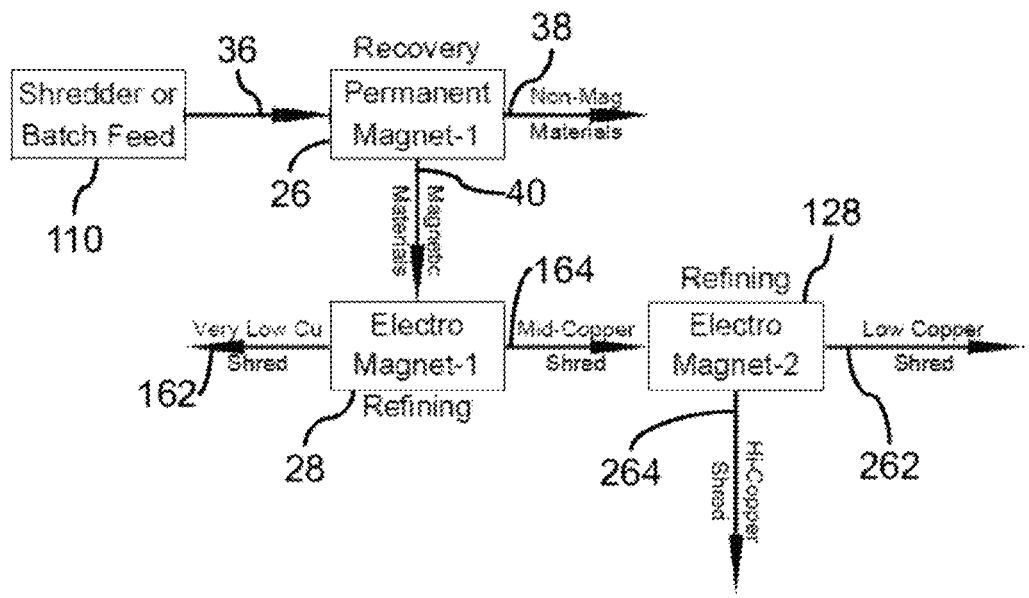
FIG. 17 is a flow diagram of an alternative embodiment having a single permanent magnet recovery drum separator and two electromagnetic drum separators for refining the ferrous material fraction.
Figure 18:
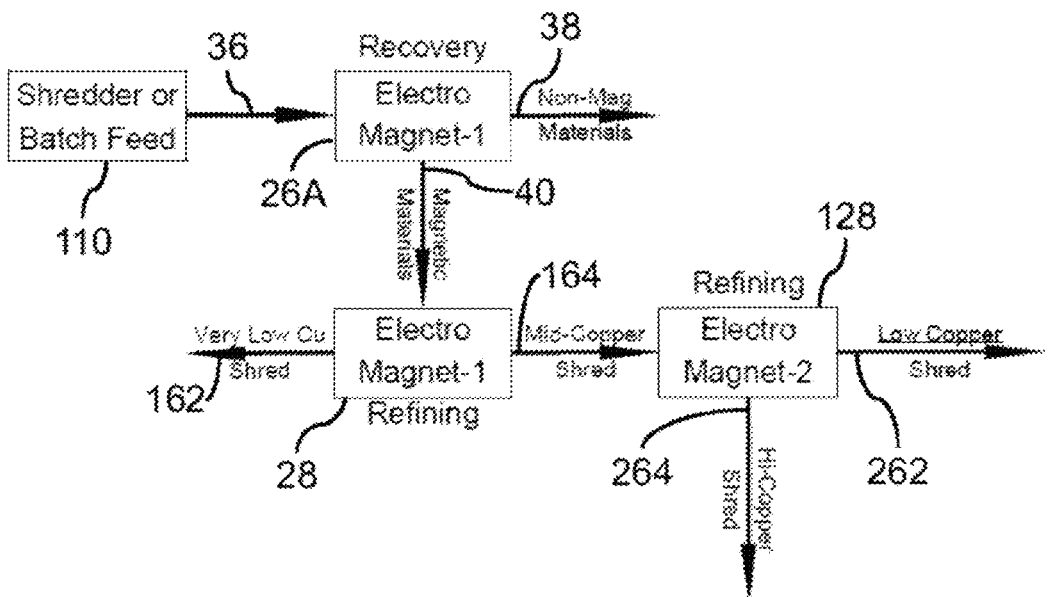
FIG. 18 is a flow diagram of an embodiment similar to the embodiment of FIG. 17 but with an electromagnetic recovery drum separator.

FIGS. 17 and 18 illustrate systems and methods employing two refining electromagnetic separator drums instead of a single refining drum. As seen in FIG. 17, a first variable electromagnetic refining drum separator 28 receives ferrous scrap material from recovery drum 26 as indicated by arrow 40. This scrap material is then processed by drum separator 28 in the manner discussed above with reference to system 20. Drum separator 28 thereby generates a very low copper first fraction of ferrous scrap material as indicated by arrow 162 and a second fraction having a higher copper content as indicated by arrow 164. This higher mid-copper content shred is transported to a second variable electromagnetic refining separator drum 128 which operates in the same manner as drum separator 28. This second refining drum separator 128 generates a third fraction of shredded scrap material (arrow 262) which is attracted to drum 128 and a fourth fraction of shredded scrap material (arrow 264) which free falls at drum separator 128. The fourth fraction of scrap material (arrow 264) has a higher non-ferrous (e.g., copper) content than the third fraction of scrap material (arrow 262). It is noted that the relative positions of the arrows indicating scrap material flow in FIGS. 13-20 do not necessarily convey the actual physical direction, such as up or down, that the material would travel in this process but merely indicate the progression of the process.

The use of a second variable electromagnetic refining drum separator which operates in the same manner as drum separator 28 discussed above with reference to system 20, allows the operator of the system to generate three different fractions of ferrous scrap material of different quality. The first refining drum separator 28 can be adjusted so that the first fraction of material contains nearly all ferrous material and has a very low non-ferrous (e.g., copper) content. By setting it at this level, however, the remaining shred may still be capable of further refining. The second refining drum separator 128 is used to further refine the second fraction of material generated by the first refining drum separator and generates a third fraction of material that contains relatively low amounts of non-ferrous material (e.g., copper) as exemplified by arrow 262 and a fourth fraction with a relatively higher non-ferrous (e.g., copper) content as exemplified by arrow 264. In this system, the first fraction (arrow 162) generated by drum 28 will have the lowest non-ferrous content, with the third fraction (arrow 262) having the next lowest non-ferrous content and the fourth fraction (arrow 264) having the highest non-ferrous content.

FIG. 18 illustrates a system which has the same arrangement of two refining drum separators 28, 128 as shown in FIG. 17 but differs from FIG. 17 in that it employs an electromagnetic recovery drum separator instead of the permanent magnet drum separator used in FIG. 17.

Figure 19:
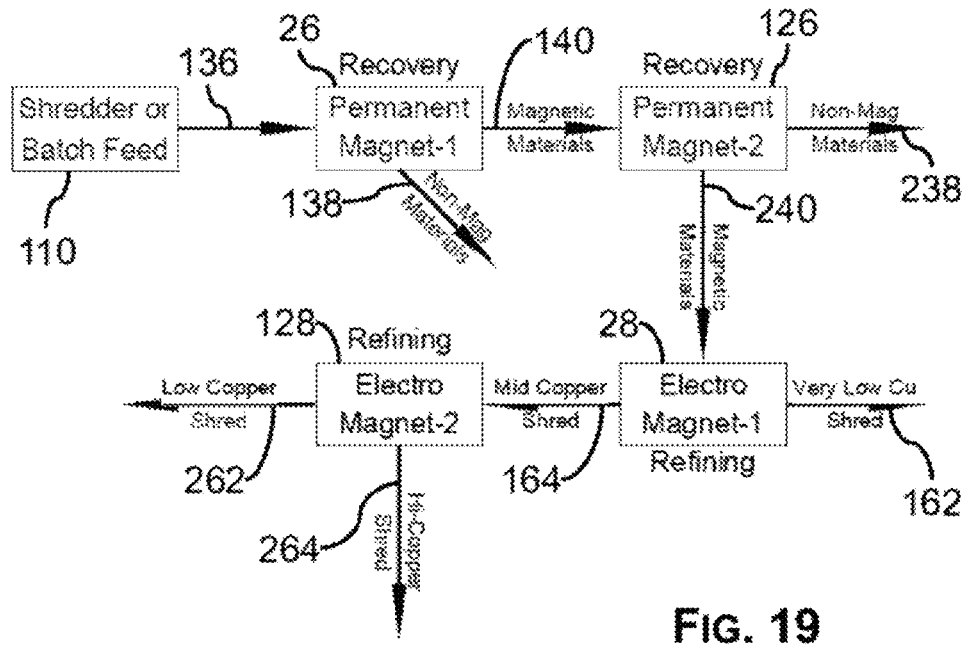
FIG. 19 is a flow diagram an embodiment having two permanent magnet recovery drum separators and two electromagnetic drum separators for refining the ferrous material fraction.
Figure 20:
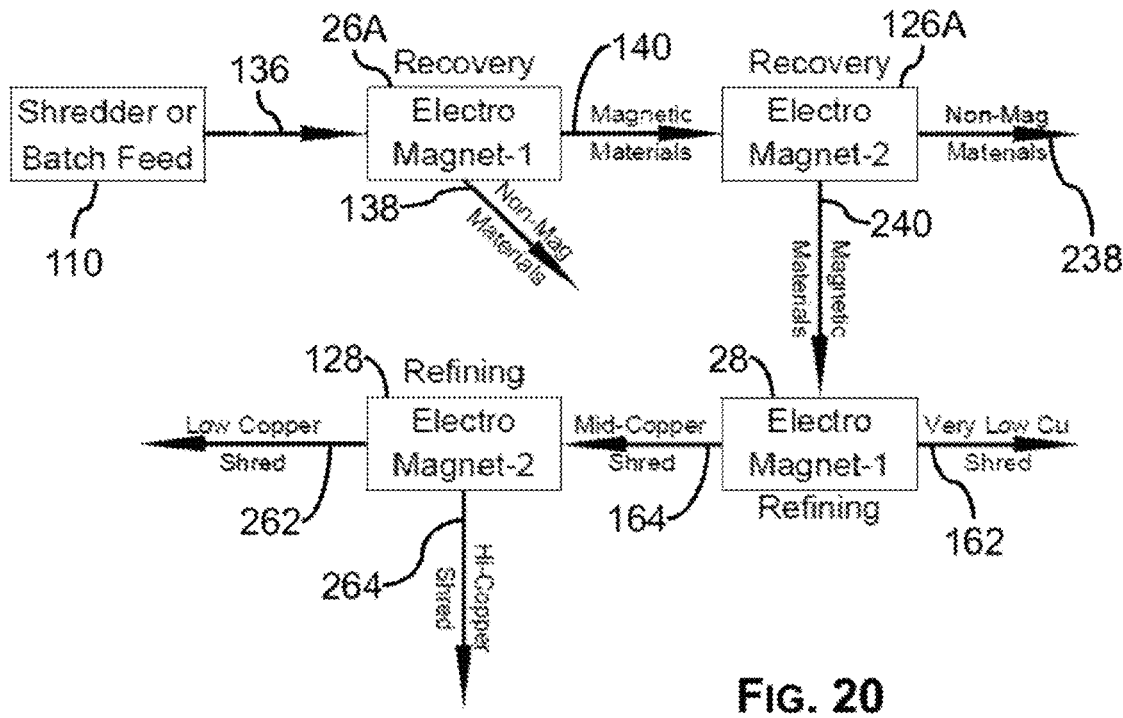
FIG. 20 is a flow diagram of an embodiment similar to the embodiment of FIG. 19 but with two electromagnetic recovery drum separators.

FIGS. 19 and 20 illustrate systems which combine two recovery drums with two refining drums. In the system of FIG. 19, two permanent magnet recovery drums 26, 126 (similar to the system of FIG. 15) are combined with two variable electromagnetic separator drums 28, 128 (similar to FIGS. 17 and 18). In the system of FIG. 20, two electromagnetic recovery drums 26A, 126A (similar to the system of FIG. 16) are combined with two variable electromagnetic separator drums 28, 128 (similar to FIGS. 17 and 18).

While this invention has been described as having an exemplary design, the present invention may be further modified within the spirit and scope of this disclosure. This application is therefore intended to cover any variations, uses, or adaptations of the invention using its general principles.

What is claimed is:

1. A scrap processing system comprising:
   a first vibrating pan facilitating separation of scrap material;
   a magnetic drum separator;
   a second vibrating pan;
   an electromagnetic drum separator; and
   an output chute;
   wherein the scrap material falls from the first vibrating pan proximate to the magnetic drum separator;
   wherein the magnetic drum separator attracts a first portion of the scrap material and separates the first portion of the scrap material from a second portion of the scrap material, the first portion of the scrap material comprising ferrous material and the second portion of the scrap material having a higher non-ferrous content than the first portion of the scrap material;
   wherein the first portion of the scrap material is deposited by the magnetic drum separator on the second vibrating pan;
   wherein the second vibrating pan facilitates separation of individual pieces of the first portion of the scrap material as it travels towards the electromagnetic drum separator;
   wherein the electromagnetic drum separator attracts a third portion of the scrap material and separates the third portion of the scrap material from a fourth portion of the first portion of the scrap material, the third portion of the scrap material comprising low-copper ferrous material and the fourth portion of the scrap material having a higher copper content than the third portion of the scrap material; and
   wherein the electromagnetic drum separator directs the third portion of the scrap material into the output chute.

2. The scrap processing system of claim 1, wherein the first vibrating pan comprises an elevated end and a lower end, wherein the scrap material flows from the elevated end to the lower end.

3. The scrap processing system of claim 1, wherein the second vibrating pan comprises an elevated end and a lower end, wherein the scrap material flows from the elevated end to the lower end.

4. The scrap processing system of claim 1, wherein the scrap material is received by the first vibrating pan.

5. The scrap processing system of claim 1, further comprising a chute adapted to guide the second portion of the scrap material to a collection bin.

6. The scrap processing system of claim 1, further comprising at least one sensor for identifying material to be removed from the third portion of the scrap material by a robotic picker.

7. The scrap processing system of claim 6, wherein the at least one sensor selected from the group consisting of a digital camera, an induction sensor, a near infrared camera, and a laser measurement sensor.

8. The scrap processing system of claim 6, wherein the sensor identifies copper and other undesired materials and the robotic picker is adapted to selectively grab the materials identified by the sensor.

9. The scrap processing system of claim 8, wherein the robotic picker comprises at least one gantry structure for moveably supporting a robotic arm adapted to selectively grab the materials identified by the sensor.

10. The scrap processing system of claim 1, further comprising a shredder generating the scrap material.

11. The scrap processing system of claim 10, wherein the scrap material is generated by shredding at least one automobile.

12. The scrap processing system of claim 1, wherein the first portion of the scrap material is carried under a rotation axis of the magnetic drum separator.

13. The scrap processing system of claim 1, wherein the magnetic drum separator comprises a shell and a permanent magnet assembly located within the shell.

14. The scrap processing system of claim 1, wherein the electromagnetic drum separator comprises a variable power electromagnet adjustable to control a copper content of the material present in the third portion of the scrap material.

15. The scrap processing system of claim 14, wherein the third portion of the scrap material is carried under a rotation axis of the electromagnetic drum separator.

16. A drum assembly for a scrap processing system, the drum assembly comprising:
 a magnetic drum separator adapted to attract a first portion of scrap material and separate the first portion of scrap material from a second portion of scrap material, the first portion of the scrap material comprising ferrous material and the second portion of the scrap material having a higher non-ferrous content than the first portion of the scrap material; and
 an electromagnetic drum separator adapted to attract a third portion of scrap material and separate the third portion of scrap material from a fourth portion of the first portion of scrap material, the third portion of scrap material comprising low-copper ferrous material and the fourth portion of the scrap material having a higher copper content than the third portion of the scrap material;
 wherein the magnetic drum separator directs the first portion of scrap material towards the electromagnetic drum separator.

17. The drum assembly of claim 16, wherein the first portion of scrap material is carried under a rotation axis of the magnetic drum separator.

18. The drum assembly of claim 16, wherein the magnetic drum separator comprises a shell and a permanent magnet assembly located within the shell.

19. The drum assembly of claim 16, wherein the electromagnetic drum separator comprises a variable power electromagnet adjustable to control a copper content of the material present in the third portion of scrap material.

20. The drum assembly of claim 19, wherein the third portion of the scrap material is carried under a rotation axis of the electromagnetic drum separator.

* * * * *